Figure 1:
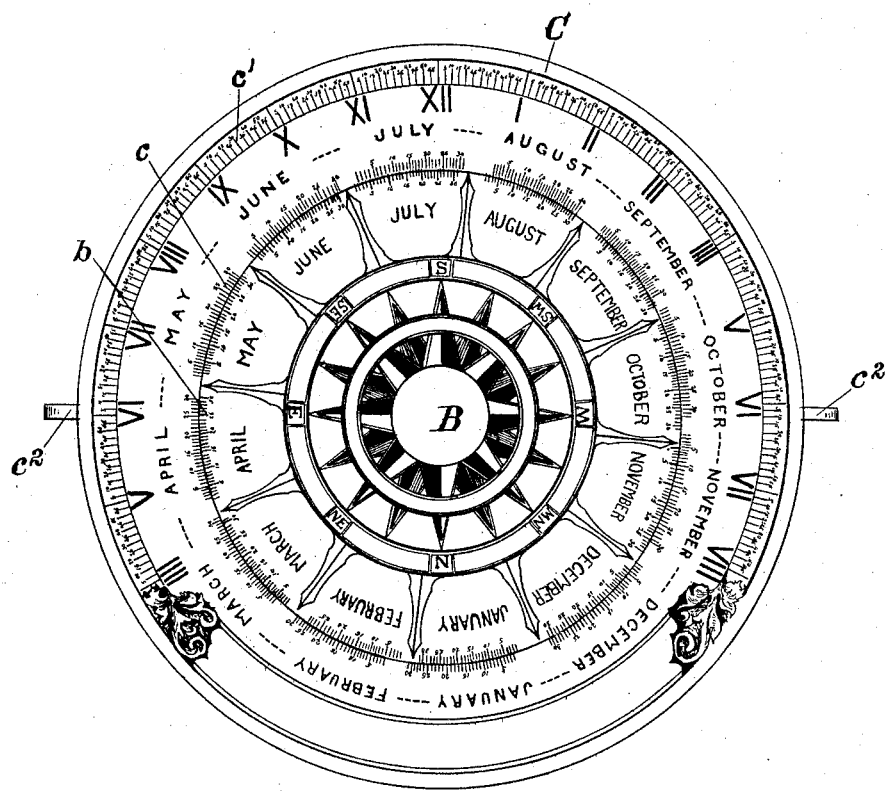

W. R. PILKINGTON.
SUN DIAL.
APPLICATION FILED AUG. 19, 1911.

1,044,238.

Patented Nov. 12, 1912.
8 SHEETS—SHEET 1.

W. R. PILKINGTON.
SUN DIAL.
APPLICATION FILED AUG. 19, 1911.

1,044,238.

Patented Nov. 12, 1912.
8 SHEETS—SHEET 2.

Witnesses:
W. L. Burch
Carl H. Donch

Inventor,
William R. Pilkington,
by Herbert W. Jenner,
Attorney.

W. R. PILKINGTON.
SUN DIAL.
APPLICATION FILED AUG. 19, 1911.

1,044,238.

Patented Nov. 12, 1912.
8 SHEETS—SHEET 3.

W. R. PILKINGTON.
SUN DIAL.
APPLICATION FILED AUG. 19, 1911.

1,044,238.

Patented Nov. 12, 1912.
8 SHEETS—SHEET 4.

Witnesses:
W. L. Busch
Care H. Donch

Inventor.
William R. Pilkington,
by Herbert W. Jenner.
Attorney.

W. R. PILKINGTON.
SUN DIAL.
APPLICATION FILED AUG. 19, 1911.

1,044,238.

Patented Nov. 12, 1912.
8 SHEETS—SHEET 5.

W. R. PILKINGTON.
SUN DIAL.
APPLICATION FILED AUG. 19, 1911.

1,044,238.

Patented Nov. 12, 1912.
8 SHEETS—SHEET 6.

W. R. PILKINGTON.
SUN DIAL.
APPLICATION FILED AUG. 19, 1911.
1,044,238.
Patented Nov. 12, 1912.
8 SHEETS—SHEET 7.
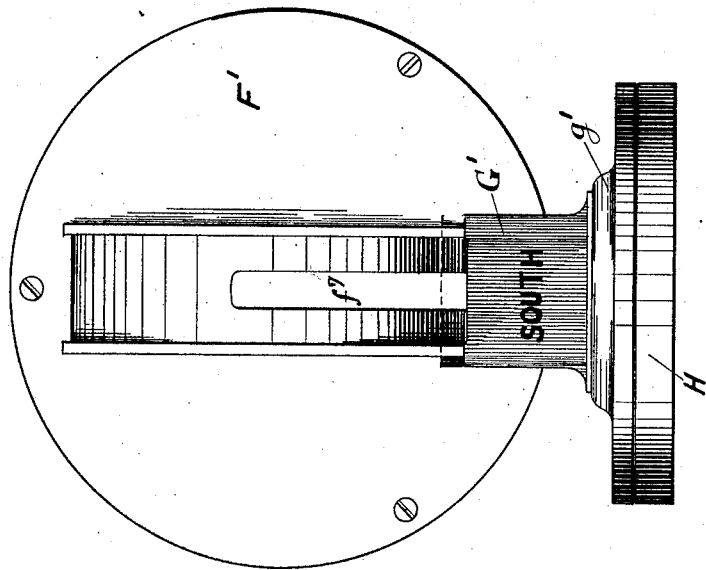
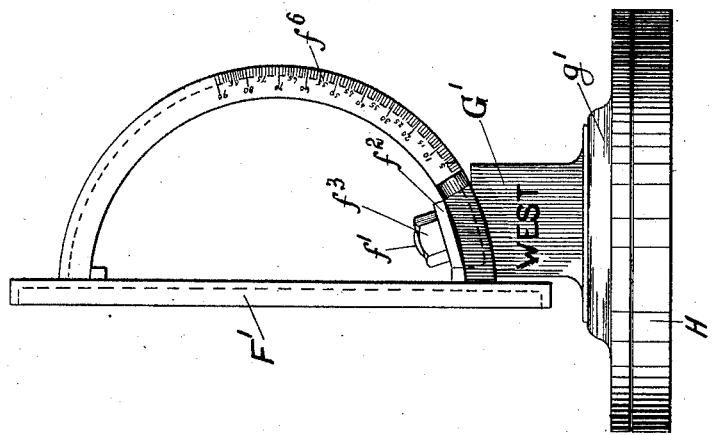

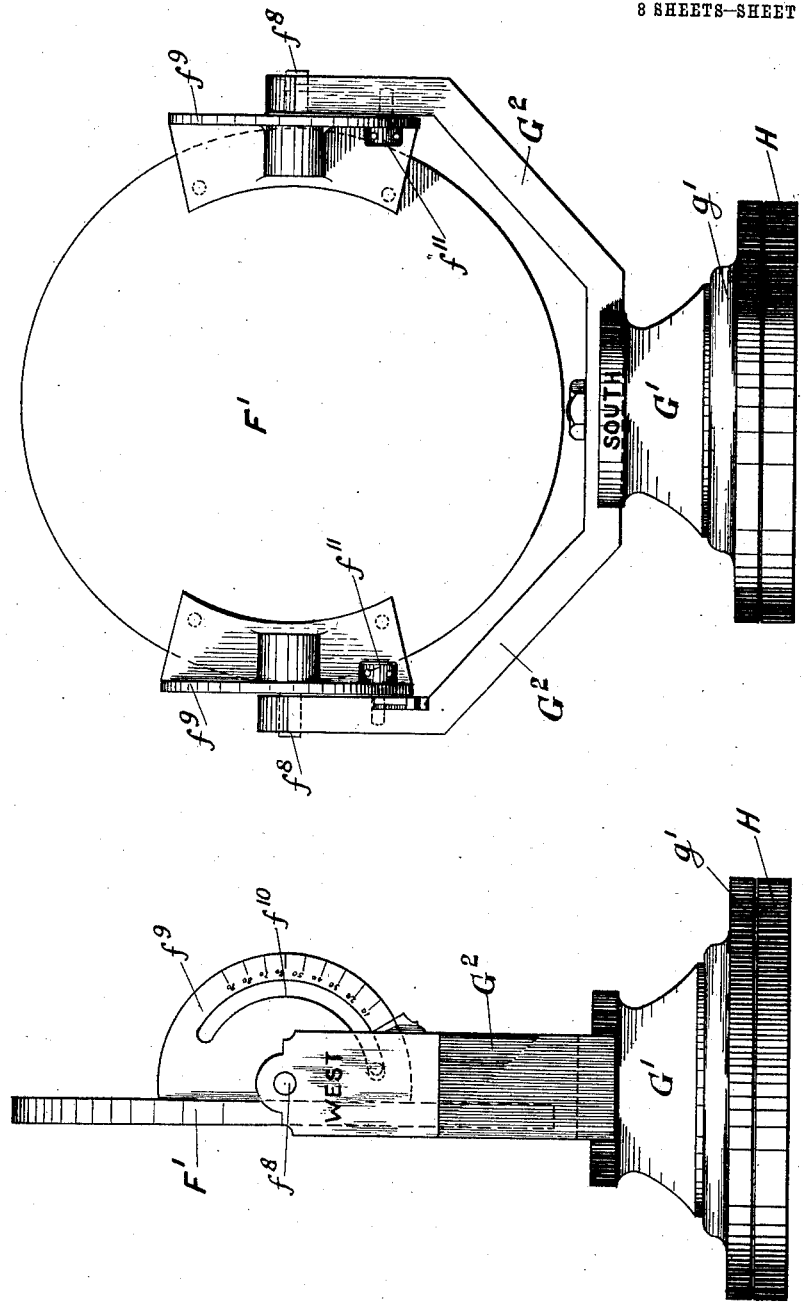

UNITED STATES PATENT OFFICE.

WILLIAM RENARD PILKINGTON, OF BAMBER BRIDGE, NEAR PRESTON, ENGLAND.

SUN-DIAL.

1,044,238.  Specification of Letters Patent.  Patented Nov. 12, 1912.

Application filed August 19, 1911. Serial No. 644,945.

*To all whom it may concern:*

Be it known that I, WILLIAM RENARD PILKINGTON, a subject of the King of Great Britain, residing at Dowry House, Bamber Bridge, near Preston, in the county of Lancaster, England, have invented certain new and useful Improvements in Sun-Dials, of which the following is a specification.

This invention relates to time indicating apparatus which can be adjusted to compensate for the difference between solar time and mean time at different periods of the year and also to show the time at any longitude and has for its chief object to construct a simple and efficient form of apparatus which can be readily and accurately set for effecting the aforesaid corrections and will not be liable to be detrimentally affected by long continued exposure to varying climatic conditions.

A further object of the invention is to obtain a sharply defined sun ray for facilitating the accurate reading of the apparatus.

According to this invention two screens are arranged in rigid connection with each other and are pivotally mounted in relation to a fixed and a movable disk or member each of which bears a date circle divided into months and subdivided into days by graduations which are so spaced and arranged as to indicate by what amount the movable member must be rotated on a given date to show mean time instead of solar time, the last mentioned member also bears a time circle divided by graduations into hours and minutes or other appropriate periods of time, and in order to show mean time at any longitude a pointer is adjustably mounted upon the aforesaid screen and is arranged to be secured in line with or to one side or the other of the sun ray or shadow hereinbefore referred to.

A feature of the invention in connection with the aforesaid screens consists in so constructing and arranging the same that the ray of light passes into a darkened chamber whereby such ray becomes more sharply defined and its position in relation to the line on the rear screen can be more readily ascertained.

In order that the said invention may be clearly understood and readily carried into effect the same is described with reference to the accompanying drawings, in which:—

Figure 2:
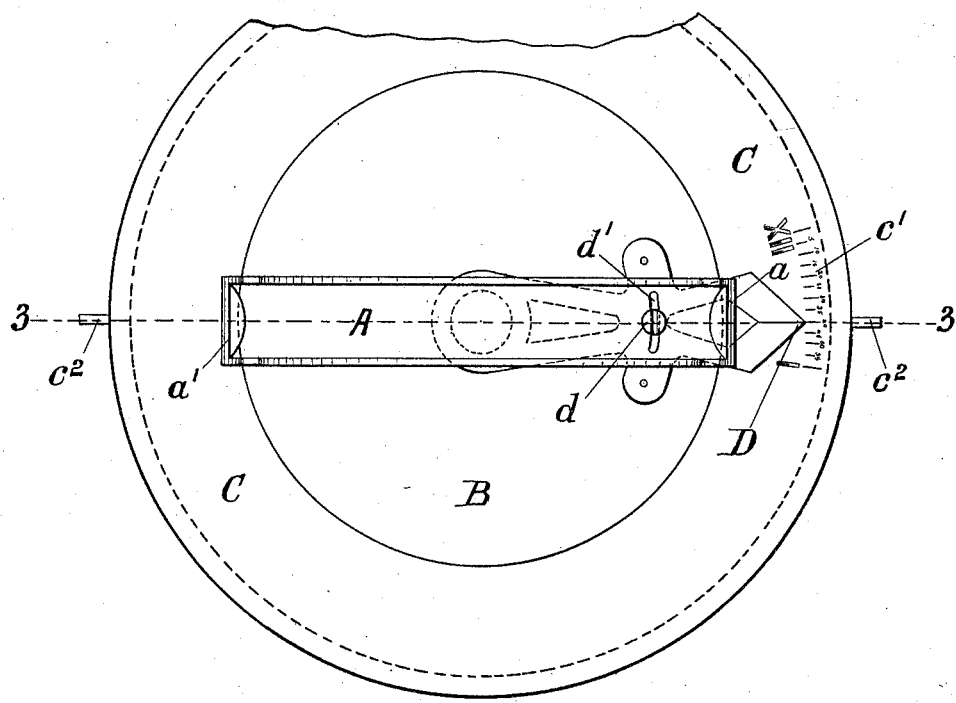
Figure 3:
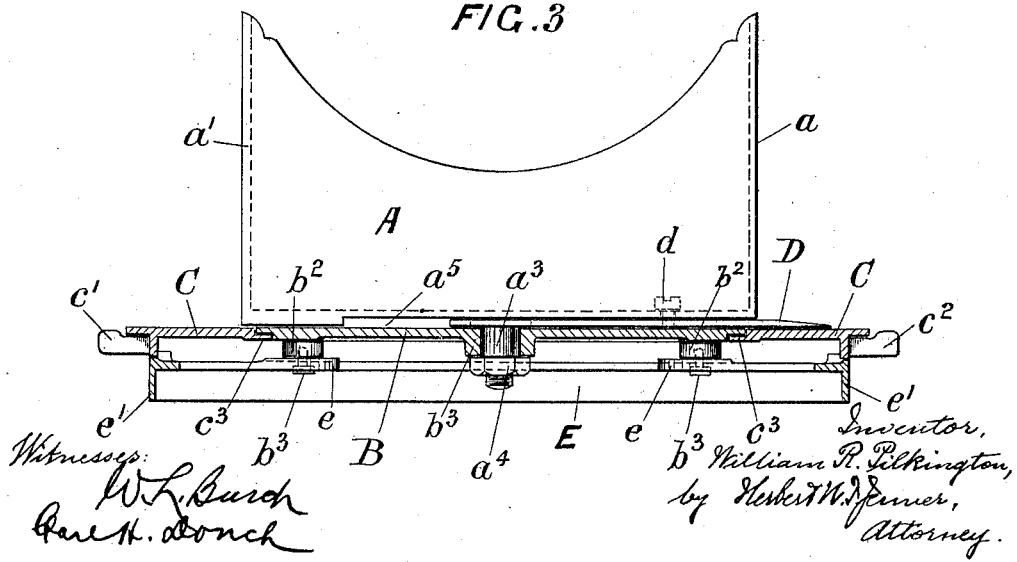
Figure 4:
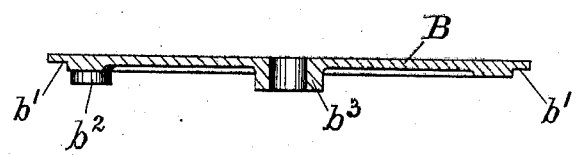
Figure 5:
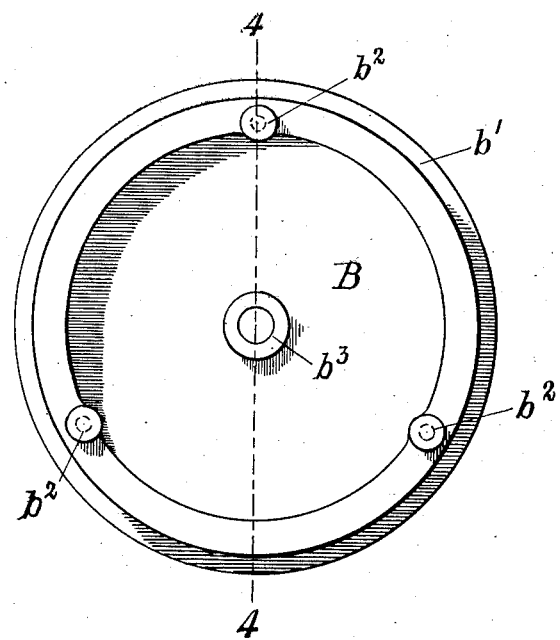
Figure 6:
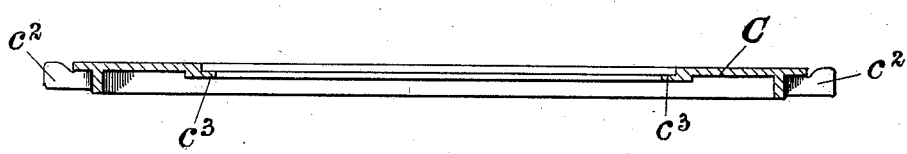
Figure 7:
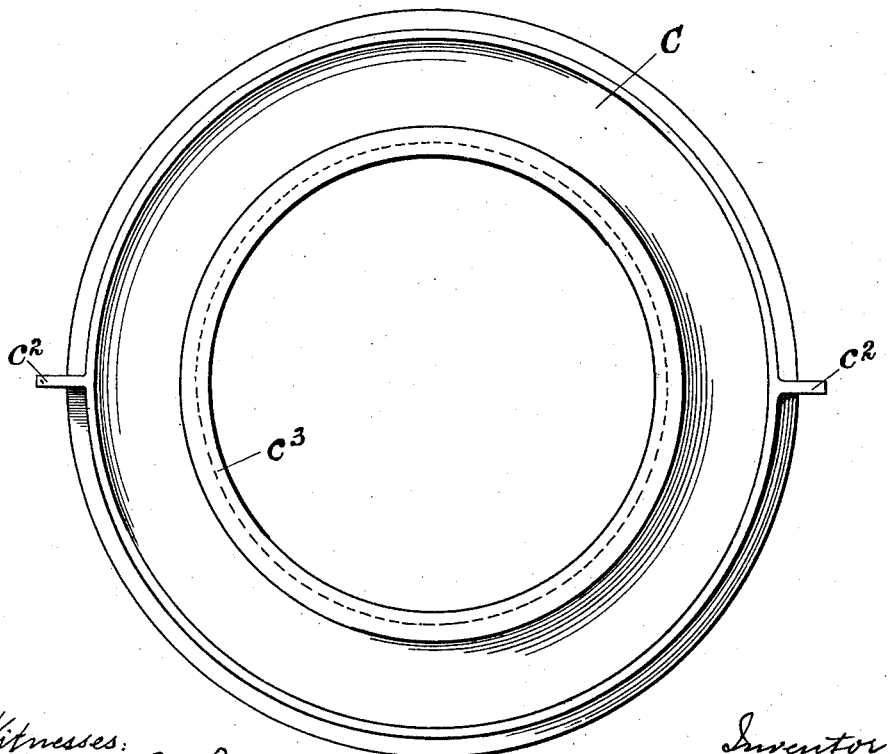
Figure 8:
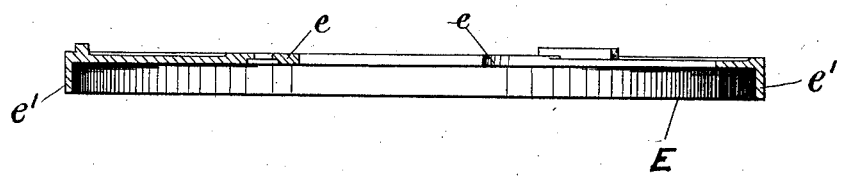
Figure 9:
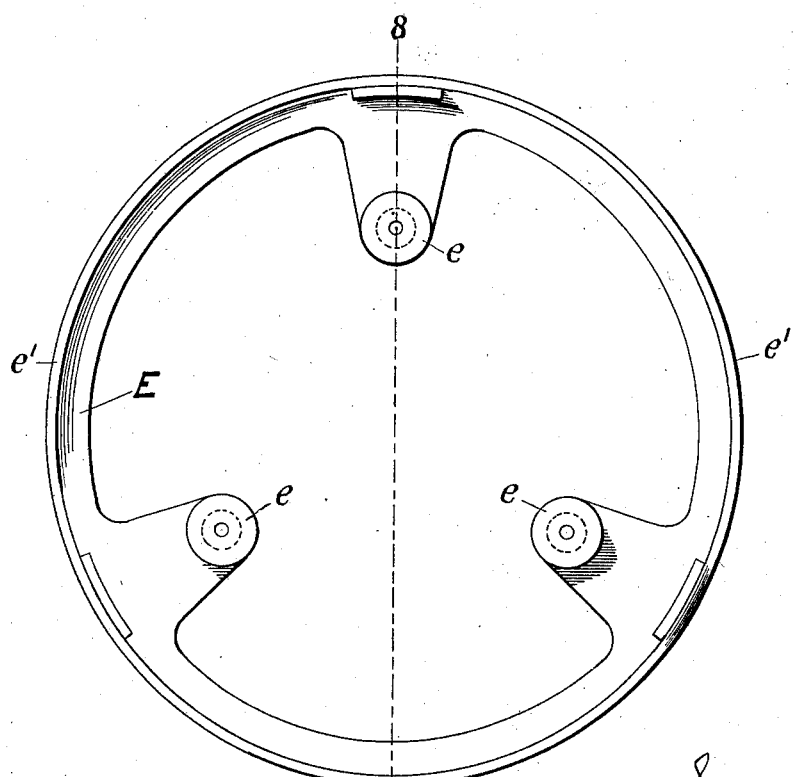
Figure 10:
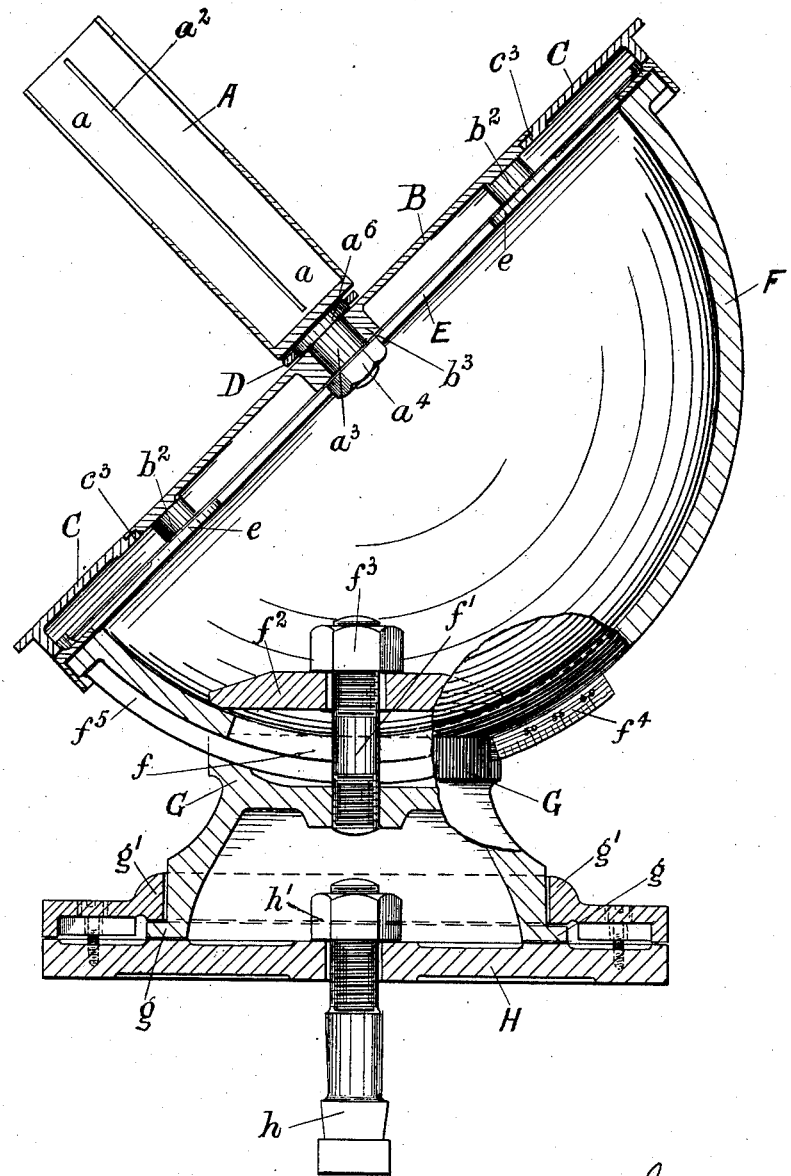

Figure 1 is a plan of the dial of the apparatus showing the various graduations. Fig. 2 is a plan of the fixed and movable disk together with the screens, the greater portion of the graduations being omitted. Fig. 3 is a section taken on line 3, 3 of Fig. 2, the screens being shown in elevation. Fig. 4 is a detached section of the fixed disk taken on line 4, 4 of Fig. 5. Fig. 5 is an inverted plan of Fig. 4. Fig. 6 is a detached section of the movable disk. Fig. 7 is an inverted plan of Fig. 6. Fig. 8 is a detached section of a ring for supporting the fixed and movable disks, taken on line 8, 8 of Fig. 9. Fig. 9 is a plan of Fig. 8. Fig. 10 is a vertical section of the apparatus. Fig. 11 is a side elevation, and Fig. 12 a rear elevation of the apparatus showing a modified adjusting device to permit of the apparatus being set to any latitude. Figs. 13 and 14 are similar views to Figs. 11 and 12, showing a further modified form of adjusting device.

A indicates the chamber carrying the two screens, B the fixed disk, C the movable disk, and D the pointer for effecting corrections to suit different longitudes.

In the arrangement shown in Fig. 1, $b$ and $c$ indicate the graduations of the date circles, which as already mentioned are spaced and arranged to indicate by what amount the disk C must be rotated on a given date to show mean time instead of solar time, $c^1$ indicates the graduations of the time circle (five minute divisions being shown for the sake of clearness) and $c^2$, $c^2$ indicate handles or projections for rotating the disk C upon the disk B. The upper faces of the disks B and C are preferably arranged on the same plane, and a convenient method of supporting such disks is illustrated in Figs. 3 and 10. The disk B shown detached in Figs. 4 and 5 is recessed at $b^1$ around its outer peripheral portion for the reception of a flange $c^3$ (Fig. 3) projecting inwardly from the annular disk C. On the under side of the disk B are three tapped bosses $b^2$ for the reception of screws $b^3$ (Fig. 3) by means of which the disk B is clamped to a supporting ring E fixed to a bowl or plate F that is capable of adjustment to suit various latitudes. The movable disk C, shown detached in Figs. 6 and 7, rests upon the supporting ring E and is retained in position thereon by the flanged portion $c^3$ engaging with the recess $b^1$ in the fixed disk B. The supporting ring E, shown detached in Figs. 8 and 9, is formed with internal projections $e$ for the aforesaid screws $b^3$ and with a flange $e^1$ which encircles the outer peripheral portion of the bowl or plate F, screws or other suitable means being employed for securing the ring E to the bowl or plate F. The chamber A in the example shown is made in the form of a rectangle of which the front wall $a$ constitutes the front screen and the rear wall $a^1$ the rear screen. Extending through the front screen $a$ Fig. 10 is a narrow slit $a^2$ through which the sun ray passes onto a line pierced, engraved, or otherwise marked on the rear screen $a^1$, the side walls of the chamber serving to darken the interior thereof, with the result that the sun ray is sharply defined, and its position in relation to the line on the rear screen can be readily ascertained. If desired a series of holes may be substituted for the narrow slit $a^2$ shown in Fig. 10 for the passage of the sun ray. Projecting from the bottom of the chamber A is a pivot $a^3$ which passes through a boss $b^3$ extending from the center of the fixed disk B and is secured to the latter by a nut $a^4$ mounted upon a reduced portion of the pivot. The base of the chamber A is recessed at $a^5$ to receive the pointer D which is pivoted on a shouldered portion $a^6$ Fig. 10 of the pivot $a^3$ and is secured in any adjusted position in relation to the sun ray or shadow passing through the front screen onto the rear screen by a screw $d$ passing through a slot $d^1$ in the bottom of chamber A. In the example shown in Fig. 10 the support for the dials comprises a bowl F supported in a cup G and capable of angular adjustment therein in a vertical plane for enabling the dials to be set to any latitude. This is effected in the example under consideration by forming a slot $f$ in the bowl F for a stud $f^1$ which passes through such slot and enters a tapped hole in the aforesaid cup G, a washer $f^2$ and nut $f^3$ being employed for clamping the bowl in any adjusted position. The adjustment is indicated by a scale $f^4$ carried by the bowl, and in the present example such scale is indicated upon a slotted sector $f^5$ that is received within a slotted portion of the cup G. The latter rests upon a base plate H, and is formed around its lower portion with a flange $g$ that is engaged by a clamping ring $g^1$ screwed to the base plate H. This arrangement permits of the whole apparatus being swiveled for adjustment about a vertical axis and secured in any adjusted position. Any suitable device such for example as a rag bolt $h$ and nut $h^1$ may be employed for securing the base plate to a pedestal or other support.

In the modification shown in Figs. 11 to 14, a plate $F^1$ is substituted for the bowl F, the adjustment for various latitudes being effected in Figs. 11 and 12 by a graduated sector $f^6$ slidably mounted in a bracket $G^1$ and secured in any adjusted position thereon by a stud $f^1$ passing through a slot $f^7$ in the sector and provided with a washer $f^2$ and nut $f^3$.

In Figs. 13 and 14, the plate $F^1$ is suspended from two pivots $f^8$ projecting from brackets $f^9$ secured to the back of the plate. These pivots are journaled in a bracket $G^2$ that is rigidly secured to the bracket $G^1$. In this example, one or both of the brackets $f^9$ may be graduated for indicating lateral adjustment and be slotted as shown at $f^{10}$ for the reception of a locking screw $f^{11}$ screwed onto the bracket $G^2$.

Adjustment of the brackets $G^1$ in the aforesaid modifications is provided for by the clamping ring $g^1$ on the base plate H in a similar manner to that which has already been described with reference to Fig. 10. In each of the modifications the dials are secured to the plate $F^1$ by the supporting ring E previously referred to. If desired such ring may be provided with suitable stops for limiting the amount of movement of the disk C relatively to the disk B.

To utilize the instrument the outer ring C is turned until the current date indicated by one or another of the graduations $c$ coincides with the current date indicated by one of the graduations $b$ on the fixed disk B. This adjusts the dial for the equation of time. The screen carrying member A is now turned to move the screens simultaneously and until the sun throws a sun ray through the narrow slit in the front screen onto the line or indication mark on the rear screen, whereupon the correct time is indicated by the pointer D. By adjusting the position of the pointer with respect to the narrow slit the instrument can be corrected to show Greenwich time in England, and true clock time in any other country.

What I claim as my invention and desire to secure by Letters Patent of the United States, is:—

1. In a sun dial, the combination, with a graduated fixed disk, and a graduated movable disk; of a screen carrying member provided with a front screen and a rear screen and mounted pivotally on the said fixed disk, and an adjustable pointer connected to the screen carrying member and adapted to point to the graduations on the movable disk, said pointer being adjustable laterally of the sun ray cast by the front screen upon the rear screen.

2. In a sun dial, the combination of a graduated fixed disk, a graduated movable disk, a screen carrying member provided with a front and rear screen arranged in rigid connection with each other and pivotally mounted upon the fixed disk, a pointer interposed between the screen carrying member and the fixed disk and means for securing the pointer to the screen carrying member.

3. In a sun dial, the combination of a fixed disk having a recessed portion extending around the under side of its outer peripheral portion and a plurality of bosses projecting from its under face, a supporting ring having internal arms to which such bosses are secured, an annular disk concentrically arranged around the fixed disk and having an internal flange engaging with the recessed portion of the fixed disk and an external flange resting upon the supporting ring, means for adjusting the annular disk relatively to the fixed disk and a screen carrying member pivotally mounted upon the latter.

In testimony whereof I affix my signature in presence of two witnesses.

WILLIAM RENARD PILKINGTON.

Witnesses:
 ERNOLD SIMPSON MOSELEY,
 MALCOLM SMETHURST.

Copies of this patent may be obtained for five cents each, by addressing the "Commissioner of Patents, Washington, D. C."